No. 653,865. Patented July 17, 1900.
T. H. & G. W. GORDON & C. E. HALL.
THRESHING MACHINE.
(Application filed Jan. 20, 1900.)

(No Model.) 3 Sheets—Sheet 2.

Witnesses:
E. R. Shipley,
M. S. Belden.

George W. Gordon
Charles E. Hall
Thaddeus H. Gordon
Inventors by James W. See
Attorney

THE NORRIS PETERS CO., PHOTO-LITHO., WASHINGTON, D. C.

No. 653,865. Patented July 17, 1900.
T. H. & G. W. GORDON & C. E. HALL.
THRESHING MACHINE.
(Application filed Jan. 20, 1900.)
(No Model.) 3 Sheets—Sheet 3.

Witnesses:
E. R. Shipley.
M. S. Belden.

Inventors
George W. Gordon
Charles E. Hall
Thaddeus H. Gordon by James W. See Attorney United States Patent Office.

THADDEUS H. GORDON, GEORGE W. GORDON, AND CHARLES E. HALL, OF NEW CASTLE, INDIANA, ASSIGNORS, BY MESNE ASSIGNMENTS, TO T. H. GORDON, GEORGE GORDON, F. M. TEEGUARDEN, JOSEPH B. HIMES, AND THOMAS L. CAMPBELL, OF SAME PLACE.

THRESHING-MACHINE.

SPECIFICATION forming part of Letters Patent No. 653,865, dated July 17, 1900.

Application filed January 20, 1900. Serial No. 2,091. (No model.)

*To all whom it may concern:*

Be it known that we, THADDEUS H. GORDON, GEORGE W. GORDON, and CHARLES E. HALL, of New Castle, Henry county, Indiana, have invented certain new and useful Improvements in Threshing-Machines, of which the following is a specification.

This invention pertains to improvements in threshing-machines, the object being to adapt the machine to the threshing of grain and to the husking and shredding of corn; and the invention will be readily understood from the following description taken in connection with the accompanying drawings, in which—

Figure 1:
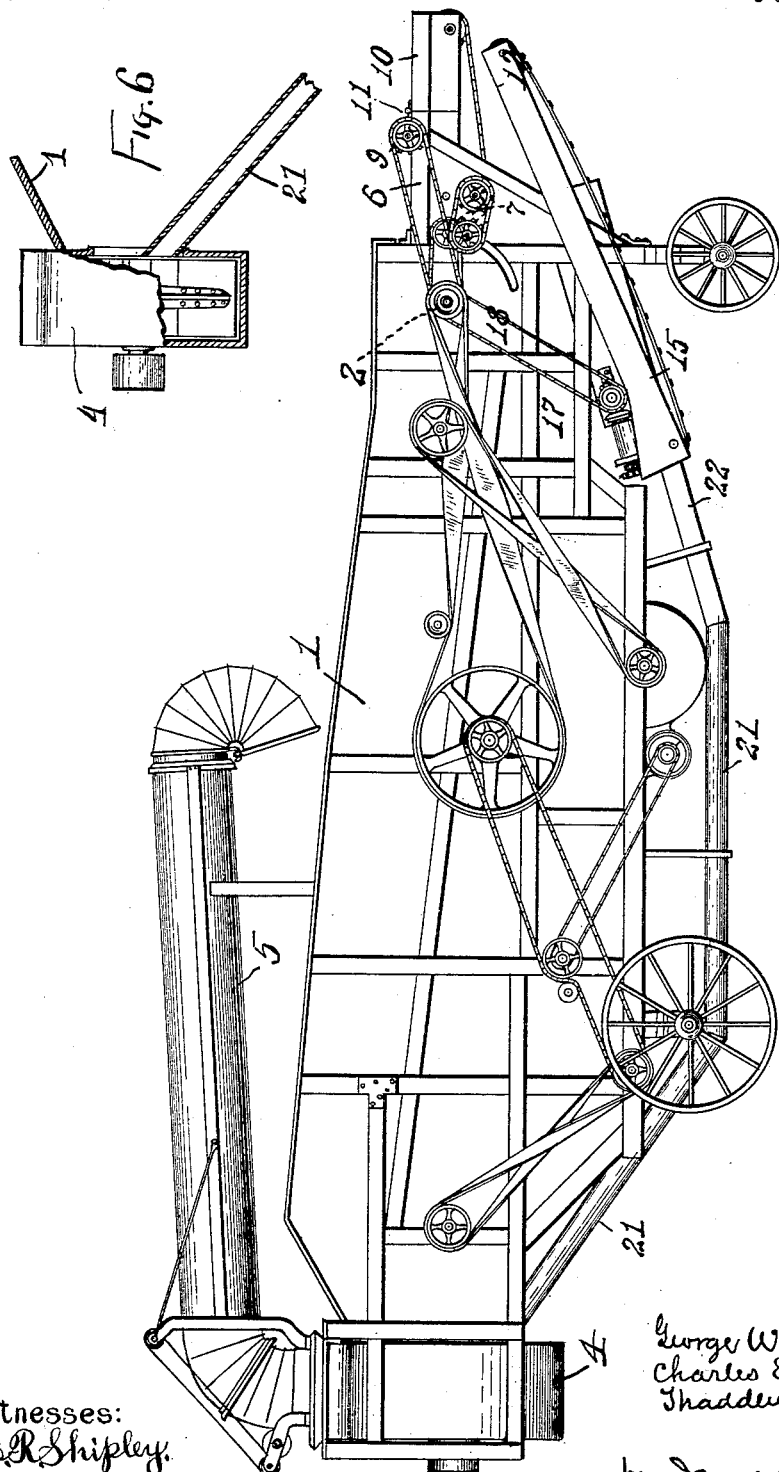
Figure 2:
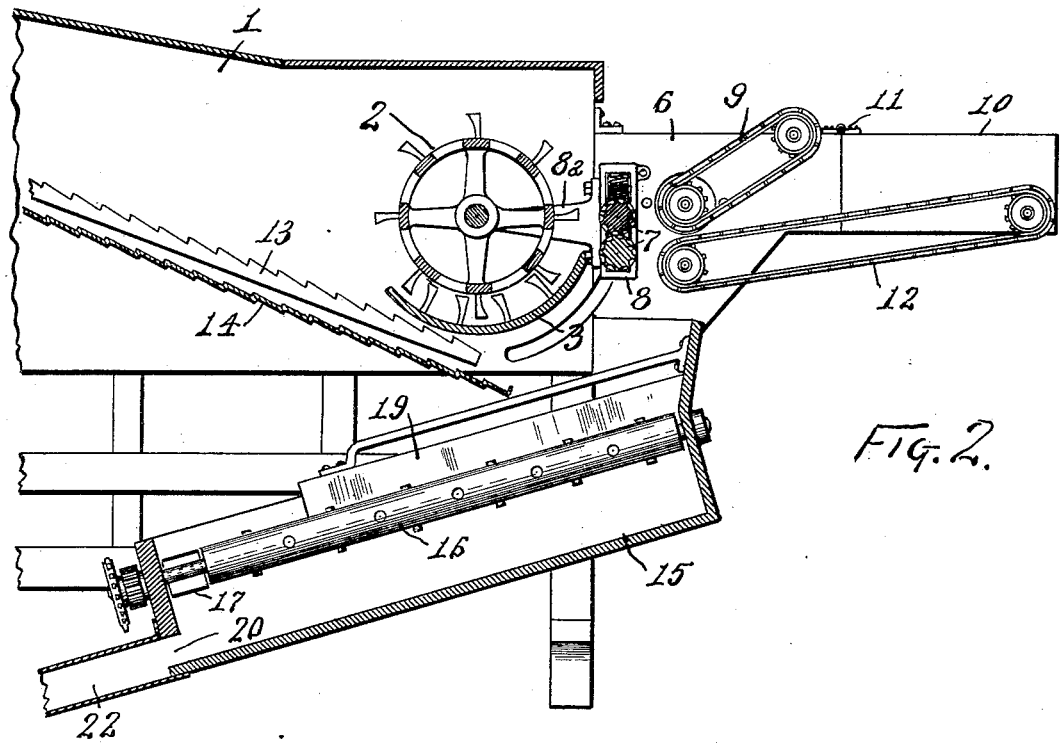
Figure 3:
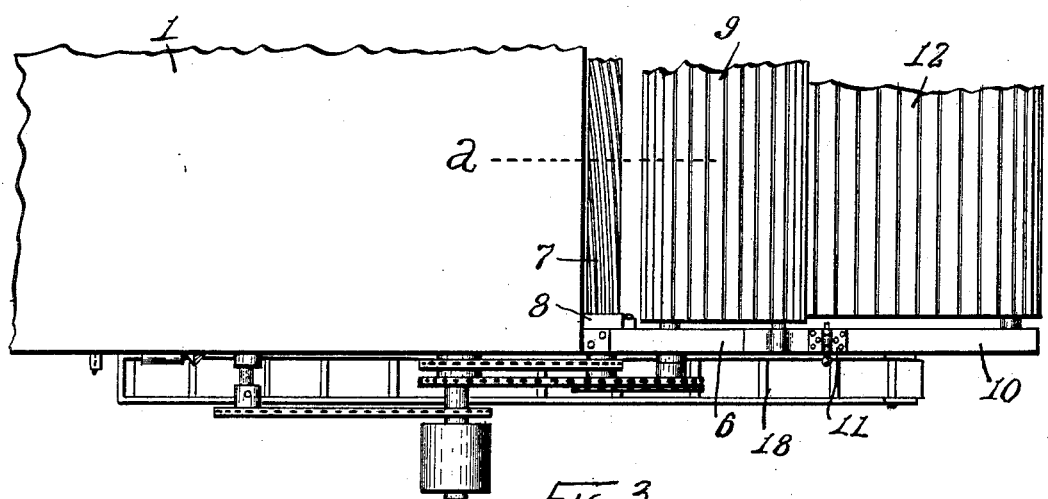
Figures 4, 5:
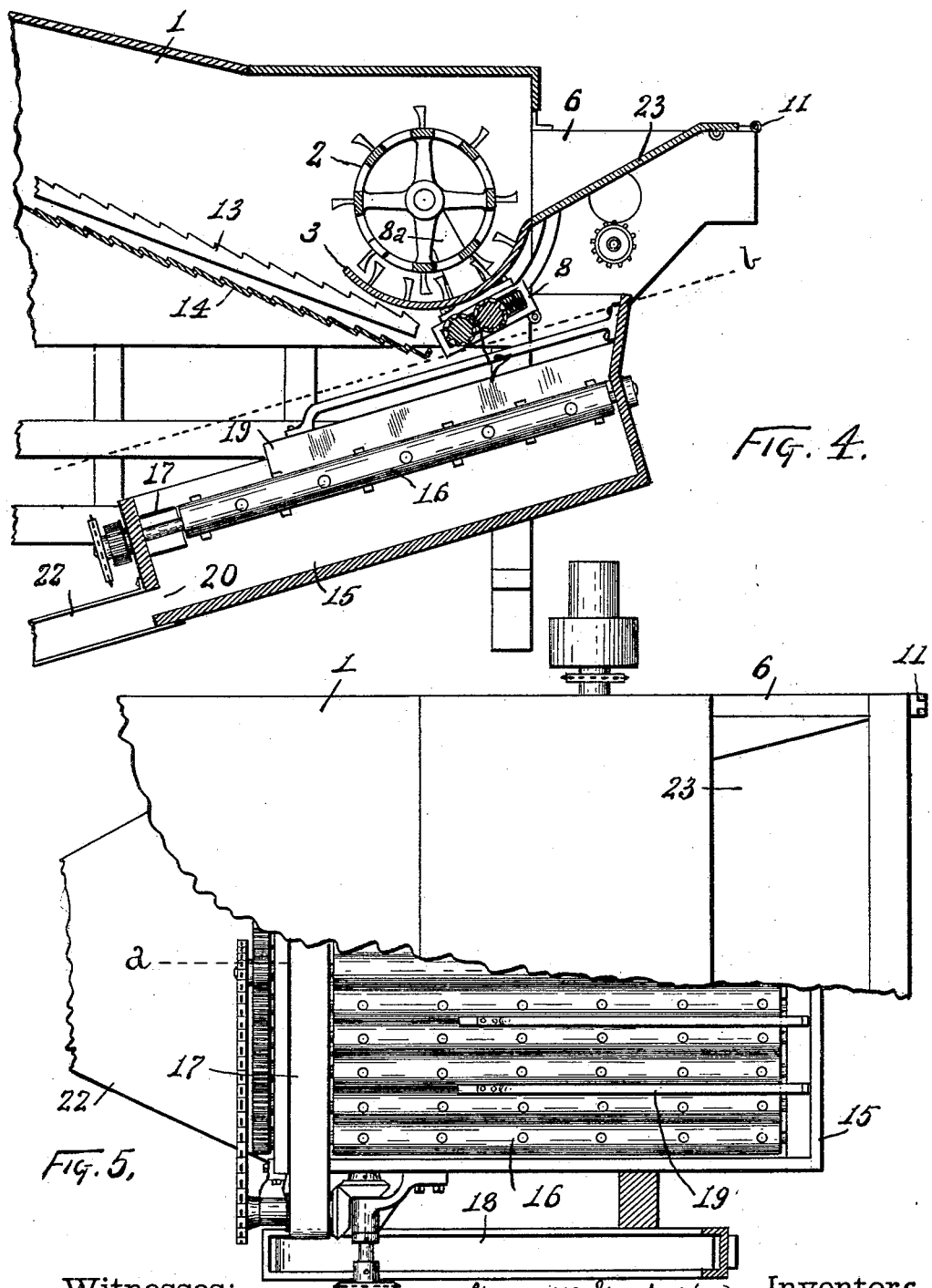

Figure 1 is a side elevation of a threshing-machine exemplifying our invention; Fig. 2, a vertical longitudinal section of the entry end of the machine, the parts being in relative disposition suited for the husking and shredding of corn and the section being in the plane of line *a* of Figs. 3 and 5; Fig. 3, a plan of a portion of the entry end of the machine with the parts in similar relative disposition; Fig. 4, a vertical longitudinal section at the entry end of the machine, the parts being in relative disposition suited to the threshing of grain, the section being in the same plane as Fig. 2; Fig. 5, a plan at the entry end of the machine, the parts being in relative disposition suited to the threshing of grain, certain parts appearing in generally horizontal section in the plane of line *b* of Figs. 1 and 4; and Fig. 6, a vertical longitudinal section at the discharge end of the machine, where connection is made with the pneumatic stacker.

In the drawings, 1 indicates the main body of the threshing-machine, which, as regards its general form and general provision of mechanism, may be as usual in ordinary grain-threshing machines; 2, the beating-cylinder of the thresher; 3, the concave in conjunction with which the cylinder operates; 4, the blast-fan of the pneumatic stacker, arranged as usual; 5, the usual discharge-tube of the stacker; 6, (excluding Fig. 4 from consideration at present,) side walls in forward prolongation of the side walls of the body of the machine at its entry end; 7, a pair of corrugated rolls disposed one above the other forward of the cylinder, these rolls being arranged to have their contiguous surfaces run toward the thresher-cylinder; 8, housings in which the boxes of rolls 7 are spring-mounted, these housings being removably secured to the walls 6; 8ª, arms attached to the housings 8 and pivoted to the side walls of the body of the thresher and serving to permit the housings 8 and the rolls 7 to swing downward to inactive position; 9, a wide feed-apron mounted on a pair of rolls housed to the side walls 6, the rear end of this apron being to the front of and near the upper one of rolls 7 and the lower ply of the apron running toward rolls 7; 10, forward extensions of side walls 6, detachably secured thereto; 11, hinges uniting extensions 10 to side walls 6, these hinges having detachable pintles, so that the hinges serve as a means by which extensions 10 may be detached from the machine or alternatively folded back upon side walls 6; 12, a wide feed-apron disposed below apron 9 and carried on two rolls, one roll being housed in side walls 6, while the other roll is housed in wall extensions 10, this apron 12 having its rear end about even with the rear end of apron 9, its other end extending farther forward than apron 9, the contiguous plies of the two aprons converging rearwardly, the disposition being such that the upper ply of apron 12 forms a rearwardly-moving feed-table leading to a feed-throat formed between the two aprons; 13, the usual vibrating straw-conveyer, leading from the concave of the thresher rearwardly toward the discharge end of the machine; 14, the usual vibrating grain-conveyer, disposed below the straw-conveyer and serving to carry rearward the grain dropping from the straw after it leaves the cylinder; 15, a rectangular curb or box disposed below rolls 7, the forward wall of this curb being somewhat forward of rolls 7; 16, a series of inclined husking-rolls disposed fore and aft in curb 15, these rolls being toothed and geared together as is usual in this type of corn-husking machines, these rolls constituting the stripping-rolls; 17, a carrier-belt disposed horizontally at the foot of the stripping-roll 16, as usual; 18, a discharge-conveyer for husked corn, the same consisting of an inclined carrier-belt whose feed is disposed below the discharge end of carrier-belt 17, as usual in this type of huskers; 19, the usual partition-boards, disposed over the alternate spaces between the stripping-rolls 16, these partitions being at the spaces at which the contiguous surfaces of the rolls run upwardly; 20, an outlet-slot at the base of the rear wall of the curb 15 of the stripping-rolls; 21, a pipe leading from the inlet of blast-fan 4 forwardly under the body of the thresher to a point somewhat to the rear of the curb of the husking-rolls; 22, a flattened pipe connecting the forward end of pipe 21 with slot 20, and 23, Figs. 4 and 5, a removable throat-piece secured between side walls 6, its floor sloping rearwardly to form a juncture with the forward edge of the concave of the thresher.

The mechanism for transmitting motion to the parts will be obvious from an inspection of the drawings and is subject to a great variety of modifications, as will be readily appreciated by those skilled in the art.

Referring to Figs. 1, 2, and 3 and giving principal attention to Fig. 2, the corn to be husked is fed head first upon apron 12 and is fed forward by aprons 9 and 12 to the rolls 7, which rolls constitute the snapping-rolls of the husker. Rolls 7 detach the ears from the stalks, the stalks being fed forward by the snapping-rolls to the cylinder and concave, the stalks and fodder being shredded by the action of the cylinder and concave, the shredded material being carried away by conveyer 13, which delivers it to the stacker, which in turn deposits it in the stack. The ears snapped from the stalks by the snapping-rolls 7 fall upon the upper ends of the stripping-rolls 16, which strip the husks from them, the ears of corn proceeding on down the stripping-rolls till finally they reach the cross-carrier 7, which takes them out sidewise and delivers them to delivering-elevator 18, which discharges them in a pile or into a wagon. The husks or any other waste material discharged downwardly by stripping-rolls 16 is received in curb 15 and is carried away to the stack by the action of the fan through pipes 21 and 22.

When the machine is to be moved, extensions 10 may be folded up over side walls 6 to make room for the horses. In the usual form of the machine, as above described, the riddling machinery of the thresher may be allowed to remain at rest by the removal of the appropriate actuating-belts.

When the machine is to be employed for the threshing of grain, then aprons 9 and 12, with their rolls, are removed by simply taking the rolls out of their bearings, as is also preferably extension 10, and snap-rolls 7 are either removed or disposed as indicated in Fig. 4. Extension 10 may be removed by uncoupling the detachable hinges 11. Throat 23 is then placed in position at the entry end of the machine, thus closing the outward discharge which previously existed at the snapping-rolls. The stripping-rolls may be allowed to come to rest by removing the appropriate actuating-belt.

It will be observed in Fig. 2 that the material fed into the machine by aprons 9 and 12 becomes divided and takes its way through two independent channels, the ears moving downwardly to the stripping-rolls, while the stalks and fodder proceed inwardly through the snapping-rolls to the space between the cylinder and the concave, while in Fig. 4 it will be observed that the throat of the machine has become modified so as to have but a single channel, all the material fed into the machine going to it between the cylinder and the concave.

Particular attention is called to the relative position of the husking-rolls 16 and the beating-cylinder and snapping-rolls. Heretofore the sloping husking-rolls have been arranged with their elevated heads below the snapping-rolls, as in our construction, so that the ears of corn falling from the snapping-rolls would fall to the high ends of the husking-rolls; but in the earlier constructions referred to the lower ends of the husking-rolls projected outwardly away from the beating-cylinder and snapping-rolls and outwardly from the entry end of the general machine, the consequence being, first, that the ears of corn and the husks stripped from them proceeded in a backward direction from the throat of the machine, while the shredded fodder proceeded onwardly in an opposite direction, and, second, that the massive husking-roll structure projected far out from the end of the machine to interfere with portability. It was not convenient to remove the husking-roll structure when the machine was to be transported or when it was to be employed for ordinary threshing purposes. In our improved construction we project the husking-roll structure under the main body of the machine, the result being that the material passing from the husking-rolls and the material passing from the beating-cylinder all go onward in the same direction, and there is practically no projection of the husking-roll structure outward from the entry end of the machine to interfere with ready portability or with the use of the machine for ordinary threshing purposes.

We claim as our invention—

1. In a threshing-machine, the combination, substantially as set forth, of a beating-cylinder, a concave therefor, a pair of removable snapping-rolls disposed at the entrance to the space between the cylinder and the concave, a corn-feeding device removably disposed in front of said snapping-rolls at sufficient distance therefrom to provide a downward discharge-passage for ears of corn between the snapping-rolls and the corn-feeding device, a series of stripping-rolls disposed below the snapping-rolls and adapted to receive the ears of corn falling through said discharge-passage, and a removable throat-piece forming a forward prolongation of the concave and adapted to suppress the downward discharge to the stripping-rolls.

2. In a threshing-machine, the combination, substantially as set forth, of a beating-cylinder, a concave therefor, a pair of snapping-rolls disposed at the entrance to the space between the cylinder and the concave, a corn-feeding device disposed in front of said snapping-rolls at sufficient distance therefrom to provide a downward discharge-passage for ears of corn between the snapping-rolls and the corn-feeding device, a series of stripping-rolls disposed below the snapping-rolls and adapted to receive the ears of corn falling through said discharge-passage, a stacker-fan at the tail of the machine, a conveyer extending rearwardly from the cylinder and concave to the stacker-fan, a curb surrounding said stripper-rolls and having an outlet in its rear wall, and a pipe extending from said curb-outlet to the stacker-fan.

THADDEUS H. GORDON.
GEORGE W. GORDON.
CHARLES E. HALL.

Witnesses as to signatures of Thaddeus H. Gordon and George W. Gordon:
H. G. YERGIN,
J. A. BERRY.

Witnesses as to signature of Charles E. Hall:
C. H. JONES,
WILL. E. HAVENS.